United States Patent [19]

Jamieson

[11] Patent Number: 5,751,611

[45] Date of Patent: May 12, 1998

[54] DISPLAY DEVICE FOR LINEARLY DISPLAYING A NON-LINEAR INPUT VARIABLE

[75] Inventor: Brian Thomas Jamieson, Meriden, Conn.

[73] Assignee: Prime Technology, Inc., North Branford, Conn.

[21] Appl. No.: 726,345

[22] Filed: Oct. 3, 1996

[51] Int. Cl.$^6$ .................................................. G06F 15/20
[52] U.S. Cl. .................. 364/573; 364/571.04; 364/577; 364/723
[58] Field of Search ............................. 364/573, 571.04, 364/509, 550, 571.01, 571.02; 73/49.2, 1 H, 1 R, 304 R

[56] References Cited

U.S. PATENT DOCUMENTS

| | | | |
|---|---|---|---|
| 4,275,382 | 6/1981 | Jannotta | 340/151 |
| 4,296,472 | 10/1981 | Sarkis | 364/509 |
| 4,382,382 | 5/1983 | Wang | 73/304 R |
| 4,487,065 | 12/1984 | Carlin et al. | 73/290 |
| 4,601,201 | 7/1986 | Oota et al. | 73/304 C |
| 4,819,483 | 4/1989 | Emplit et al. | 73/304 C |
| 4,827,762 | 5/1989 | Hasselmann | 73/49.2 |
| 4,857,894 | 8/1989 | Dahl | 340/619 |
| 4,908,783 | 3/1990 | Maier | 364/560 |
| 4,926,360 | 5/1990 | Spink, Jr. | 364/571 |
| 5,124,933 | 6/1992 | Maier | 364/509 |
| 5,247,833 | 9/1993 | Sasaya | 73/301 |
| 5,274,577 | 12/1993 | Hinrichs | 364/571.04 |
| 5,325,314 | 6/1994 | Lippmann et al. | 364/571.04 |

*Primary Examiner*—Emanuel T. Voeltz
*Assistant Examiner*—Hien Vo
*Attorney, Agent, or Firm*—Lackenbach Siegel Marzullo Aronson & Greenspan, PC

[57] ABSTRACT

A display device, in form of a panel meter which includes a combination of a linear bar graph and digital numeric display, linearly displays a non-linear input variable at an infinite number of input points. A microprocessor receives a digital input, which can be a converted analog signal, representing a non-linear variable such as a liquid level height in a tank or reservoir or a corresponding analog input received through an analog to digital (A/D) converter. A non-volatile memory stores a finite set of predetermined number n of correlated input/output points $(x_n, y_n)$ which together define a conversion function for converting a given input $(x_n)$ at any given point $(x_n, y_n)$ to an associated output $(y_n)$. Each two adjacent points $(x_0, y_0)$ and $(x_1, y_1)$ define a straight line segment. The microprocessor is programmed to interpolate for any given input x between two points $(x_0, x_1)$ to provide an output (y) between associated outputs $(y_0, y_1)$ by making the following computation:

$$y = \frac{(x-x_0)(y_1-y_0)}{x_1-x_0} + y_0$$

18 Claims, 5 Drawing Sheets

DISPLAY DEVICE FOR LINEARLY DISPLAYING A NON-LINEAR INPUT VARIABLE

BACKGROUND OF THE INVENTION

1. Field of the Invention

The present invention generally relates to visual displays and, more specifically, to a display device for linearly displaying a non-linear input variable.

2. Description of the Prior Art

Numerous devices and liquid level gages have been devised for measuring and displaying the level of a liquid within a storage tank reservoir. The prior art devices have involved numerous techniques for monitoring or physically detecting the level of the liquid in the tank reservoir, including the use of sight gages, electro-optical systems using light types, external and color lights, lenses, prisms and filters, and fiber optics. These are generally complex and expensive systems. Examples of liquid measuring systems are disclosed, for example, in U.S. Pat. Nos. 4,296,472; 4,382,382; 4,487,065; 4,598,742; 4,601,201; 4,644,177; 4,745,293; 4,857,894; 4,870,292; 4,908,783; 4,994,682; 5,124,933; 5,245,869; 5,247,833 and 5,351,036.

Tanks of ships tend to be irregular. This is in contrast to an ideal tank, for purposes of measurement, which is rectangular or cylindrical. The volume of a simple tank is generally equal to the base area times the height. With the ideal tank the cross-sectional area of the tank is constant along the height, so that the height of the liquid is directly proportional to the volume taken up by the liquid in the tank. Any simple sensor can then be used to translate the height of the liquid and correlate this information to the quantity of fluid in the tank. Most tanks used aboard ships, however, are not ideal and they tend to follow the shape of the hull. Frequently, ducts, pipes, and other three dimensional spaces or regions are contained within the tank which are not used to contain fluid. This further complicates the geometric configuration of the tank for purposes of liquid level monitoring. Therefore, in most tanks aboard ships, a tank response curve is generally not linear, and the height of the column of liquid is not directly proportional to the volume of the liquid in the tank. Not only does one have to contend with the shape of a hull, but also the exact position of the tank level sensor. The volume inside tanks through which pipes, ducts, gates, crawl spaces, tunnels or the like extend is quite common and, as suggested, complicates the liquid level measurements.

In view of the foregoing, the tank response curve of an ideal tank is generally a straight line which correlates a given height of the liquid to the volume in the tank. One of the greatest problems of the older systems is inaccuracy, and tank level readings could not be trusted. It is for this reason that certain critical tank level readings were performed manually. Such inaccuracies had been introduced by the meters themselves. If a meter had a perfect linear scale, the error that just the instrument introduced is 2%, the error introduced by electronics, such as voltage source drift, being negligible.

As indicated, aboard a ship, most liquid level scales used are non-linear. There are several errors that come into play. The system is calibrated by simulating several fluid heights corresponding to known fluid volumes. At each height, the voltmeter is marked accordingly. The resulting response curve defines the conversion transform for the particular tank involved. A plot of such response curve indicates, however, that considerable amounts of error can be introduced at points along steep slopes of the curve where small changes in height of the fluid surface produce large changes in the volume or liquid levels.

Considering the human reading errors, meter errors and calibration errors, the total errors can be significant.

On a conventional meter scale, one can record a limited number of "break points". This number is limited because physically one can only place a limited amount of nomenclature on the display scale. Such nomenclature is also usually represented in round numbers (0, 10, 20, 30 etc.), even though the outcome of the calibration procedure may not have produced round numbers. Combined, this introduces a considerable error.

While numerous techniques for calibrating of electronic instrumentation have been disclosed, these systems are typically designed for linearizing non-linear transducers which monitor some variable or parameter (e.g. thermistor or other system circuit components). See, for example, U.S. Pat. Nos. 4,253,155, which is concerned with non-linearities of system circuit components generally, and 4,713,783, which is concerned with thermistors specifically.

In U.S. Pat. No. 5,325,314, an electronic gage transform is disclosed primarily for use in vehicles where fuel gage systems may be non-linear. The patent suggests that such non-linearities in the parameter measurement device can be introduced by the sensor, irregularity in the shape of the fuel tank and/or the non-linearity in the display device itself. This patent also discloses a prior art technique for compensating for system non-linearities by using a ROM lookup table between the system circuitry and the display device. The ROM contains data which drives the display device to provide an accurate reading. The relationship between the ROM input address and the output data may correspond to points along the curve that represents the system linearity, so that, as a result, the display is driven linearly. This approach, however, is described by the patentee as having the disadvantage that it requires large amounts of memory which could render the approach relatively expensive. The patentee, therefore, discloses a gage transform which does not require the large amount of memory. The patentee proposes to compensate for system non-linearities by programming a few memory locations and implement a piecewise linear approximation to a curve transfer function which compensates for the system non-linearities. The curve of the transfer function is divided at boundary points with that part of the curve between each boundary point approximated by a straight line. However, the apparatus of this patent includes a first memory for storing values representing the distances between boundary points and second memory for storing slope values of lines connecting adjacent points along the curve. Using the information from the two memories, the apparatus provides an output value which represents the application of the curve transfer function to the input signal.

In U.S. Pat. No. 5,274,577, a system is described for linearizing a non-linear sensor output in which a processor is provided for monitoring a sensor whose output signals follow the non-linear curve in response to a linear change. The processor converts the sensor signal to a linear output proportional to or equal to the event being monitored. The processor includes a memory for storing a table which includes a starting data point value on the curve, a starting slope value to another data point on the curve and a starting curvature value for a succession of data points on the curve and a plurality of rate of change of curvature values for the curve. Calculations are made based on an initial output signal interval between data point values.

In U.S. Pat. No. 3,860,168, a plural range gage is disclosed in which a detector for monitoring a material property produces a first signal approximately exponentially related to the property value. A digital computer computes a theoretical value for the material property in accordance with the equation for a straight line and applies a binomial correction thereto, approximately to compensate for the deviation of the first signal from a true exponential relationship between it and the material property.

Using the method of the present invention, an electronic meter has the ability to contain more calibration points which, while not seen on the scale, are maintained internally in memory. During calibration, the meter may record as many points as may be needed. Calibration of the system is performed by filling the tank with a known quantity of liquid and entering this number into the computer. The computer automatically interrogates the instrument and creates a break point. Another known quantity of liquid is added to the process and is repeated. It is at the user's discretion to decide where to place these points, since the worst errors are on the steep ends of the curve, where the slopes are high, the operator can collect a large number of closely spaced data points there, limited by the resolution of the sensor itself. This is achieved by the use of a non-volatile memory which stores set-point data which has been empirically obtained.

Calibration of electronic instruments is known. Automatic calibration of multi meters, for self calibration and diagnostics, is disclosed in U.S. Pat. Nos. 4,200,933 and 4,337,517.

SUMMARY OF THE INVENTION

Accordingly, it is an object of the present invention to provide a display device or meter for linearly displaying a non-linear input variable which does not have the disadvantages inherent in such comparable previously known display devices.

It is another object of the present invention to provide a display device which is simple and inexpensive to manufacture.

It is still another object of the present invention to provide a display device as in the previous objects which has a storage device for storing significant members of data point.

It is yet another object of the present invention to provide a display device as suggested in the previous objects which provides an effective linear display particularly useful in measurements of liquid levels in irregularly shaped storage tanks.

It is a further object of the present invention to provide a display device as aforementioned which minimizes errors at substantially all liquid level readings, even at those levels where the slope or rate of change of liquid levels change dramatically as a function of liquid level height.

It is still a further object of the present invention to provide a display device of the type under discussion which minimizes human error by providing a linear output.

It is an additional object to provide a display device for linearly displaying a non-linear input variable at an infinite number of input points.

In order to achieve the above objects, as well as others which will become apparent hereinafter, a display device comprises input means for receiving digital data representative of a non-linear input variable. Computer means is connected to said input means for receiving the digital data. A substantially linear display having a display input is connected to said computer means for providing an output indication which varies linearly with a signal applied to said display input. A non-volatile memory means connected to the computer stores a finite set of predetermined number n of correlated input/output points $(x_n, y_n)$ which together define a conversion function for converting a given input $(x_n)$ at any given point $(x_n, y_n)$ to an associated output $(y_n)$. Each two adjacent points $(x_0, y_0)$ and $(x_1, y_1)$ define a straight line segment, said computer means being programmed to interpolate for any given input x between two inputs $(x_0, x_1)$ to provide an output (y) between associated outputs $(y_0, y_1)$ by making the following computation:

$$y = \frac{(x - x_0)(y_1 - y_0)}{x_1 - x_0} + y_0$$

BRIEF DESCRIPTION OF THE DRAWINGS

Other objects and advantages of the present invention will become apparent from the following detailed description of its preferred embodiment when taken in conjunction with the drawings, as follows.

DETAILED DESCRIPTION OF A PREFERRED EMBODIMENT

Figures 1, 2:
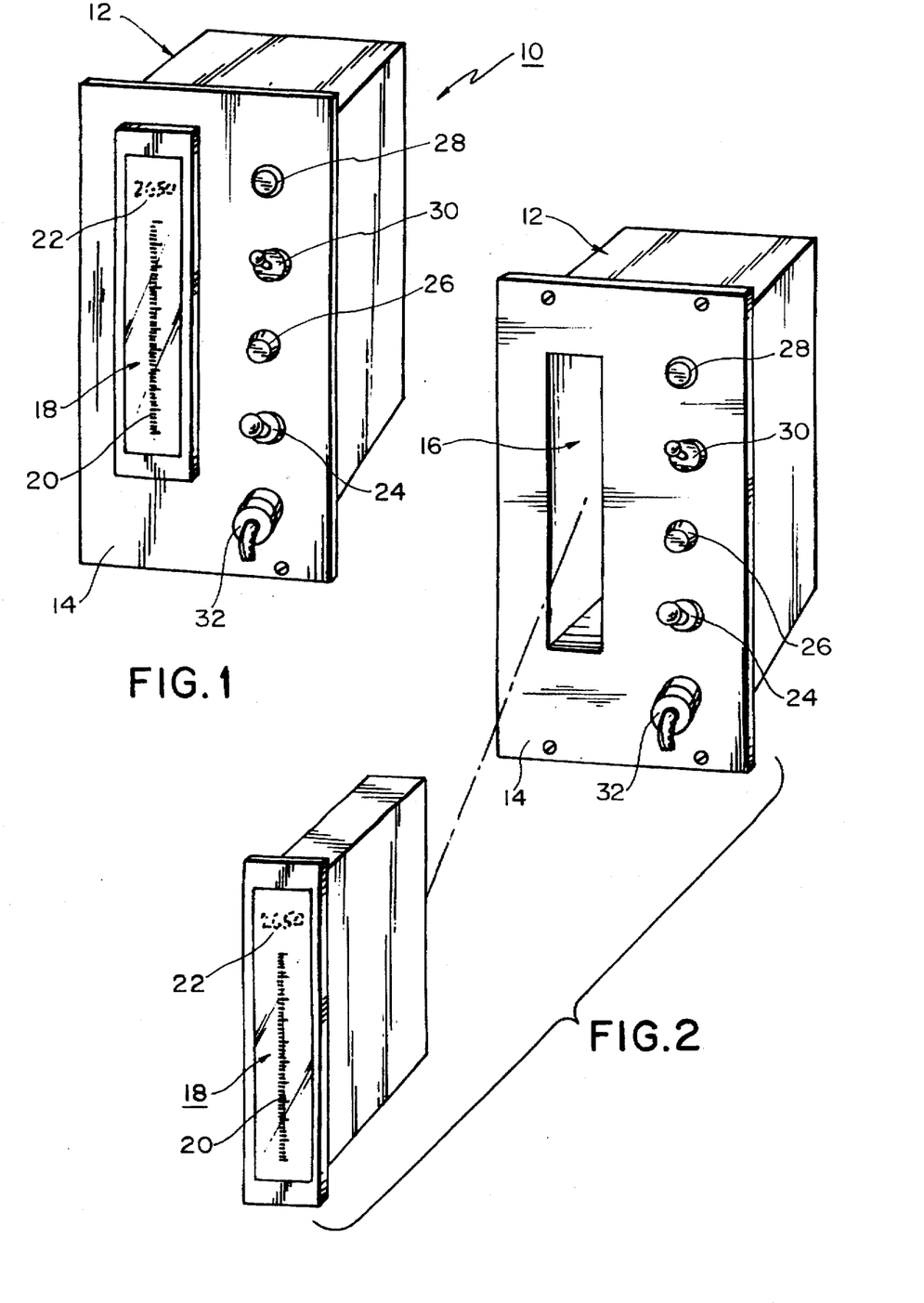
FIG. 1 is a perspective view of a tank level console or meter assembly which incorporates a display device in accordance with the present invention.
FIG. 2 is an exploded view of the tank level console or meter assembly shown in FIG. 1, illustrating the display device of the present invention removed from an associated slot or compartment in the console.

Referring now specifically to the FIGS., in which identical or similar parts are designated by the same reference numerals throughout, and first referring to FIGS. 1 and 2, a meter assembly embodying the present invention is generally designated by the reference numeral 10. The tank level console or meter assembly 10 is generally of the type used for tank level receivers. However, the meter assembly 10 can also be used in many other applications, including monitoring rudder positions, pressures, temperatures, etc. The meter assembly 10 is configurated and dimensioned to fit into existing instrument control panels on ships, utility control centers and the like. The physical dimensions and placement of connectors are preferably selected to render the meter assembly 10 completely compatible with existing standards in the industry in which the device is to be used. However, the environment for the present invention is not critical, and the invention can be used to fit and retrofit naval vessels of all types, in control centers of process facilities, and the like.

The meter assembly 10 includes a housing 12 which includes a front panel 14. The front panel 14 includes an opening or slot 16 dimensioned to receive a display device 18, which incorporates the present invention. However, the display device 18 may be mounted on the front panel 14, or may be integral therewith. The position or location of the display device 18 is not critical, and it maybe arranged in any conventional manner which is consistent with the intended use or application. While not critical, the meter assembly 10 is preferably provided with a power switch 24 on the panel 14, as well as a power light 26. An alarm circuit and associated alarm light 28 is advantageously provided for signaling an alarm condition when the meter assembly reads a measured value above or beyond pre-selected threshold levels. An optional "audio off" switch 30 may be provided to control whether an audio alarm is issued contemporaneously with the visual alarm provided by the alarm light 28. In order to provide ready access to and convenience for changing fuses, a fuse holder 32 is preferably likewise provided on the front panel 14.

Referring to FIG. 2, the front panel 14 and assembly housing 12 are provided with a slot or compartment 16 which is dimensioned to receive a removable meter or display device which incorporates the important features of the present invention. The display device 18 includes a front face 18a on which there is provided an LED bar scale 20 and, preferably, also a digital display 22 which provides a reading which corresponds to the reading on the bar scale 20. It is contemplated that the bar scale 20 be a linear scale, preferably marked or labeled with suitable indicia to designate percentages representing, for example, the extent to which a tank or reservoir is filled to capacity. Thus, when the tank or reservoir is empty, the bar scale 20, as well as the digital scale 22, show 0%, while a full tank or reservoir would provide a bar scale reading and a digital reading corresponding to 100%.

Figures 3, 4:
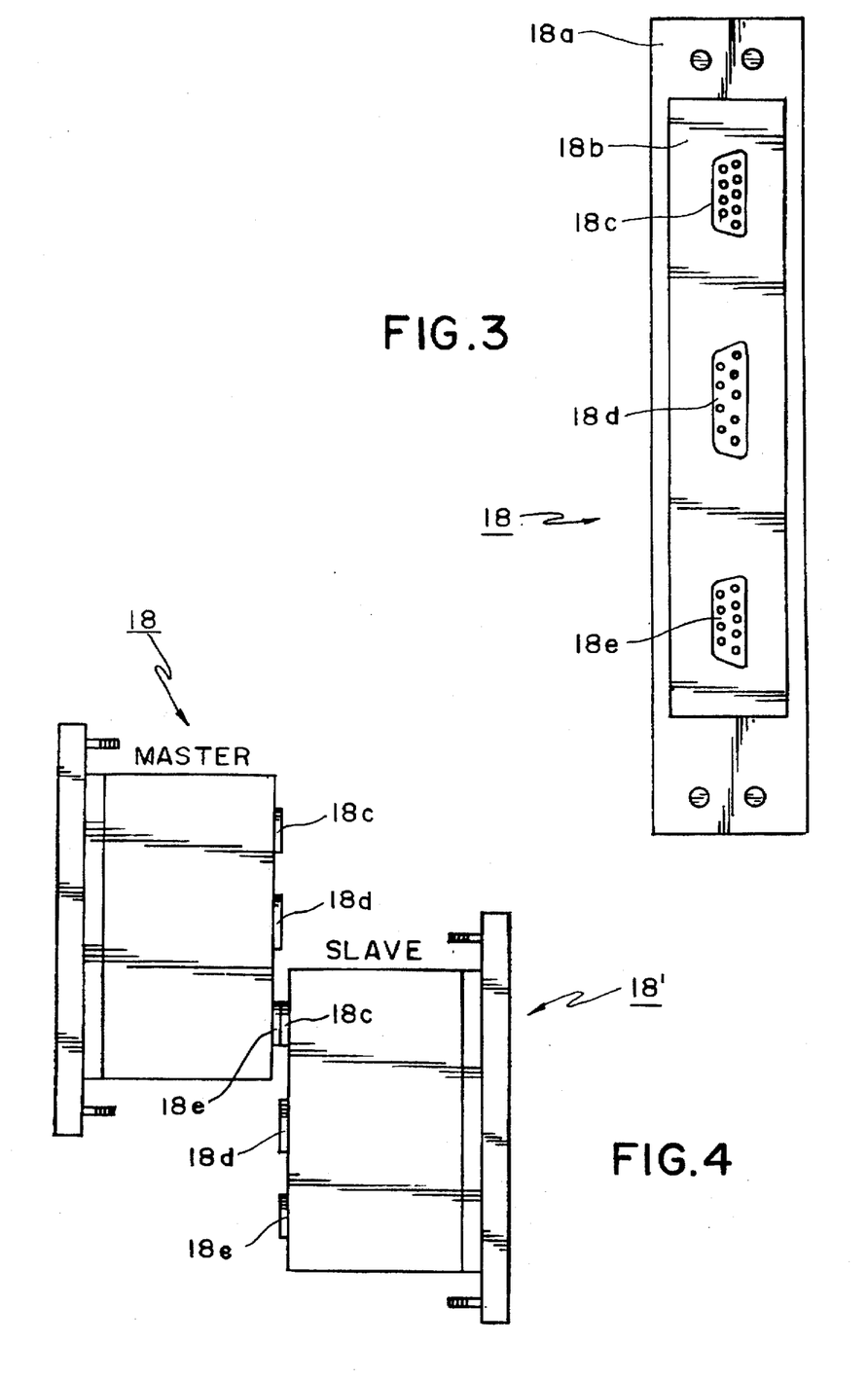
FIG. 3 is a rear elevational view of the display device or meter shown in FIGS. 1 and 2, illustrating the various interface connectors for the device.
FIG. 4 is a side elevational view of a display device or meter as illustrated in FIGS. 1–3, as mated to another like meter for purposes of transferring data in non-volatile memory.

Referring to FIG. 3, the rear of the display device 18 is illustrated as having a back wall 18b on which three multi-pin connectors 18c–18e are mounted. The specific connectors used is not critical. The connector 18c is a first connector through which power for the display device or meter is supplied. Depending on the number of pins provided on the connector 18c, the same connector may also be used for transfer of data to or from the display device. A second connector 18d is a personality connector, which will be more fully explained hereafter.

Connector 18e represents a cloning interface connector, which may be used for cloning the measurement characteristics or parameters within the display device 18 to another like display device. The subject matter of cloning is separately described, in more detail, in co-pending application Ser. No. 08/876,974 (assigned to the same assignee of the present application).

In FIG. 4, a master display device 18 is illustrated electrically connected to a slave display device 18'. In this connection, it is pointed out that the connectors 18c and 18e are of the same configuration but of different gender. Thus, for example, the connector 18c is a male connector, while the connector 18e is a female connector. In order to clone the slave display device 18' to have the same display parameters or characteristics as the master display device 18, the male and female connectors of the two units are mated, as suggested in FIG. 4, and the conversion data for linearly displaying a non-linear input variable is downloaded into the memory of the slave unit 18'. While the subject of cloning is more specifically discussed in the companion application, it is pointed out that once the slave unit has been cloned, it can achieve the same benefits and advantages by linearly displaying a non-linear input variable in accordance with the present invention.

Figure 5:
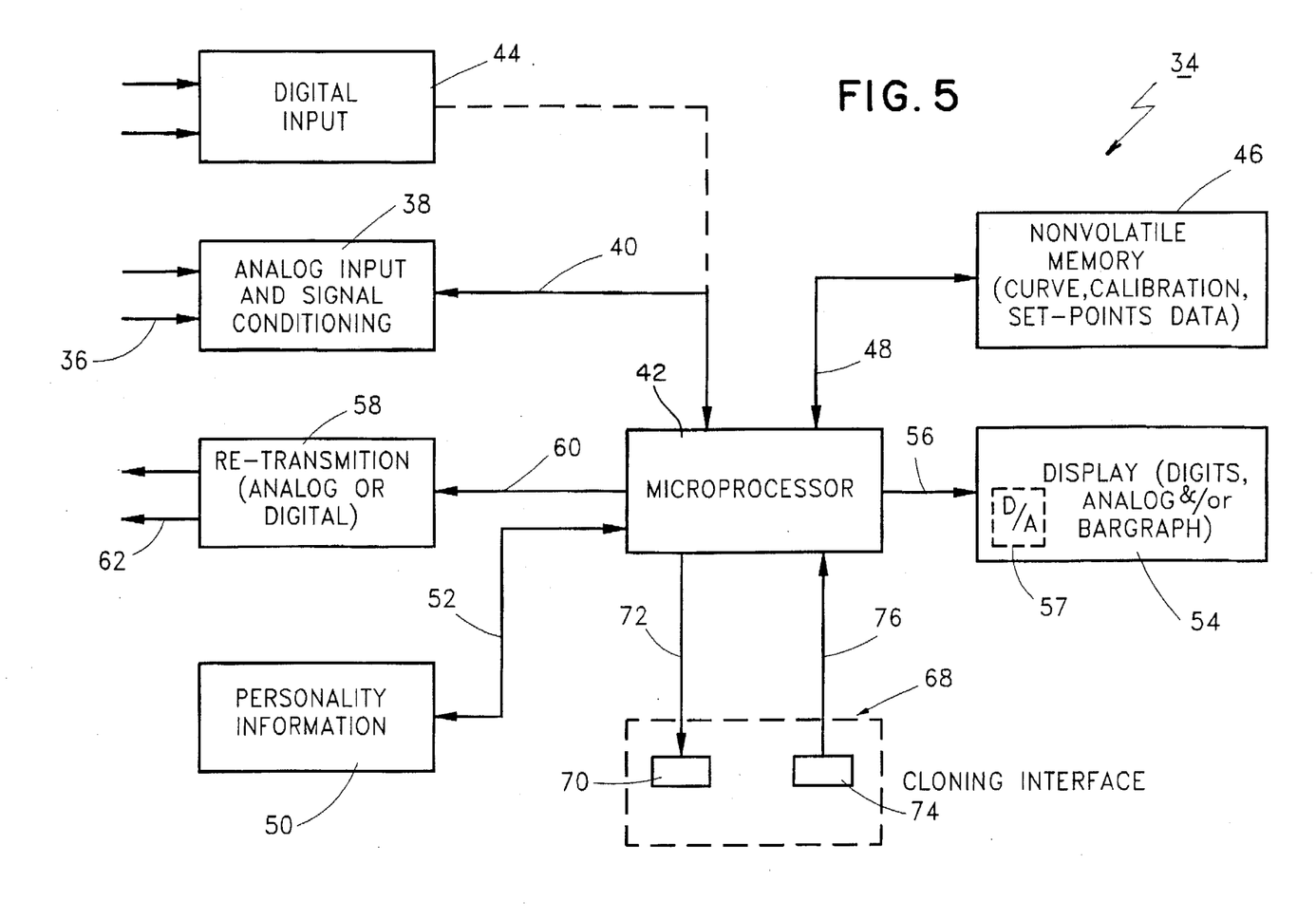
FIG. 5 is a block diagram illustrating the basic electronic components or elements of the display device in accordance with the present invention.

In FIG. 5, there is illustrated a typical circuit 34 for the meter device. The device includes input means 36 for receiving data representative of a non-linear input variable. When such data 36 is in analog form, a suitable signal conditioning circuit 38 such as an analog-to-digital converter (A/D) may be used for converting the analog data into digital data and applying the same, by means of line 40, to a microprocessor 42. Where the input data is initially in digital form, such as suggested by the reference numeral 44, the analog signal conditioning unit 38 may be omitted.

The microprocessor 42 is connected to a non-volatile memory (Novram) 46 connected to the microprocessor 42 by means of line 48 for storing a finite set of predetermined number n of correlated input/output points $(x_n, y_n)$ which together define a conversion function for converting an input $(x_n)$ at any given point $(x_n, y_n)$ to an associated output $(y_n)$. For reasons which will become evident from the disclosure, the memory 46 is preferably arranged to store a plurality of finite sets of predetermined correlate input/output points $(x_n, y_n)$, each defining a specific conversion function representative of an associated non-linear input variable.

Where the memory 46 stores a plurality of finite sets of predetermined input/output points, the microprocessor 42 may be connected to a personality selection device 50, by means of line 52, which may be a set of switches connected to the microprocessor 42 for providing "personality" information. The personality connector 50 may also be a male or female multiple pin connector or the "personality" may be the arrangement of the conductors in a harness of conductors connected to the microprocessor 42. The personality connector 50 is programmed to convey a predetermined code to the microprocessor 42, which is programmed to identify the code and select a desired set of correlated input/output points for any given application. Therefore, if each finite set of predetermined correlated input/output points $(x_n, y_n)$ represents a given fluid tank or reservoir, the microprocessor 42 will apply that finite set of points which corresponds to the selected tank or reservoir for linearizing the non-linear input variable parameters from a sensor in the tank into a linear display output.

The personality connector 50 provides the means of selecting the appropriate curve data. The novram may be, for example, a 2048×8 bit device, which can store 512 different linear curves (4 locations per curve, 4 zeros in full scale values), 1 curve with 511 different input/output pairs (4 locations per pair). Of course, any number of curves in between the extremes is permissible. Up to 256 different curves, in a minimal system, may be programmed into a 9 pin personality connector by grounding selected pins on the mating connector. The processor will read a binary number between 0 and 255 which corresponds to a particular lookup table.

The microprocessor 42 is connected to a display 54 which is substantially linear in the sense that the output displayed substantially corresponds to the input signal on line 56, and the display 54 itself does not introduce any significant or noticeable non-linearities. As discussed in connection with the display device 18 in FIG. 2, the meter or display device 18 preferably includes a linear bar scale as well as a digital display. The same is true for the display 54, both digital and bar displays being driven by signals generated by the microprocessor 42. The display 54 may also be analog, in which case a D/A converter 57 has to be provided to convert the digital data supplied by the microprocessor 42 on the line 56 to an analog signal.

The microprocessor 42 is also preferably programmed to optimally provide retransmission of linearized data, in digital or analog form, to a remote location where it can be entered into, for example, a "dumb" display which does not include the microprocessor 42 and other components illustrated in FIG. 5 or it can be downloaded into a "master" or central data processing unit where it can further be processed and/or stored for later use or evaluation.

As suggested in FIGS. 3 and 4, the display circuit 34 preferably has a cloning interface 68 which includes a male connector 70 connected to the microprocessor 42 by line 72 and a female connector 74 connected to the microprocessor 42 by means of line 76. The appropriate connector 70 or 74 will be used depending on whether the display device or meter 18 is used as a master or a slave for cloning purposes. As indicated, the details of cloning are more specifically described in companion application Ser. No. 08/826,974.

Figure 6:
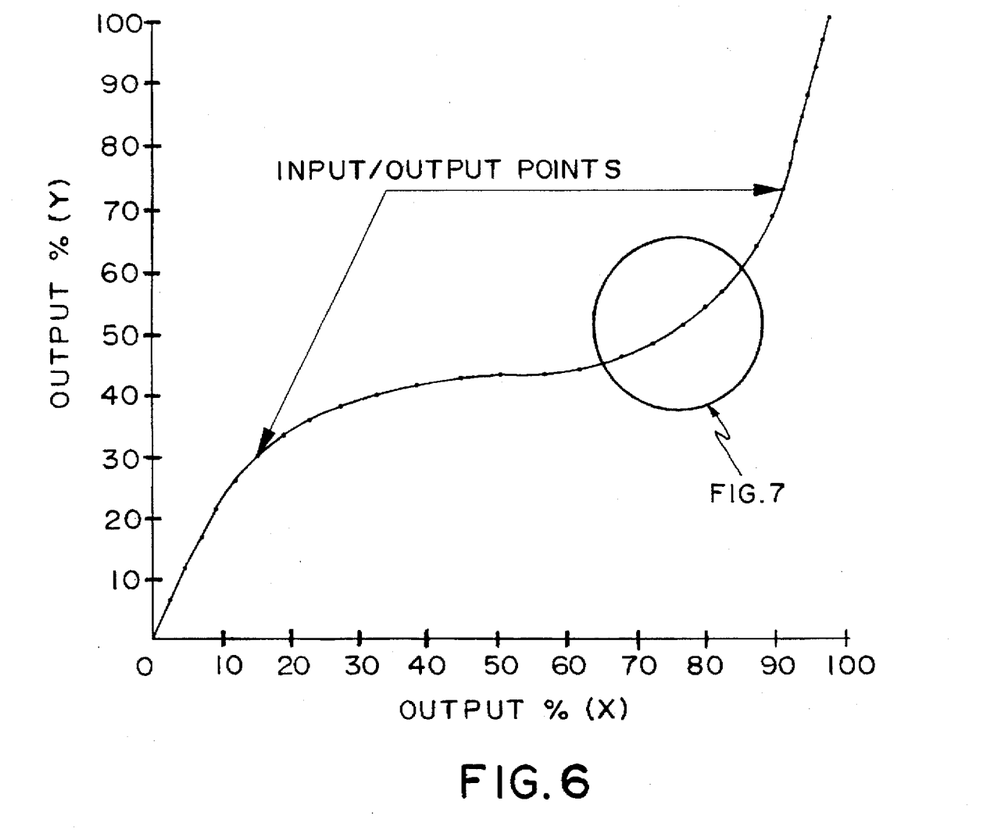
FIG. 6 is a graphic representation in the form of a plot illustrating the transfer or conversion function for converting a non-linear input variable to a linear output variable.
Figure 7:
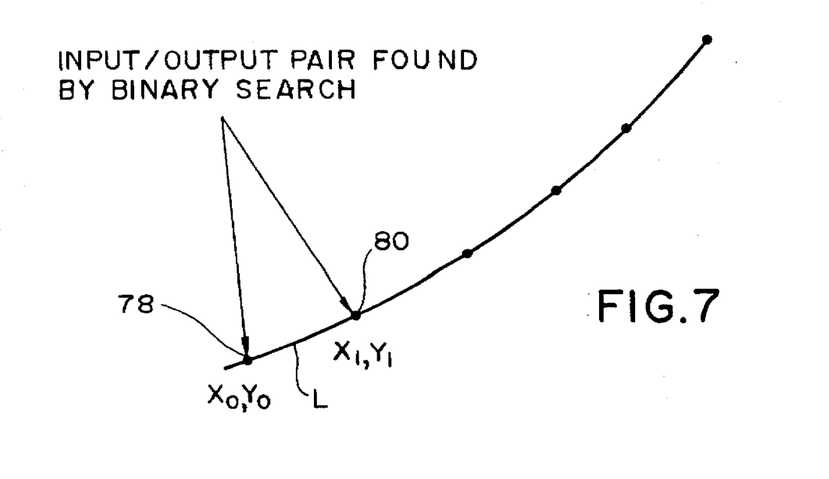
FIG. 7 is a portion of the plot shown in FIG. 6, showing the detail enclosed within the circle in FIG. 6.

Referring to FIGS. 6 and 7, the input/output points ($x_n$, $y_n$) define or plot a conversion curve which relates the percentage of the input signal to an output percentage. Each scale varies from 0 to 100%. Clearly, when the input is 0%, the output is likewise 0%. Also, when the input percent is 100%, so is the output 100% percent. However, aside from these trivial conditions where the storage tank or reservoir is either empty or full, the intermediate points follow a non-linear curve which is empirically obtained. The present invention envisions fewer or more points than shown. However, clearly, the more points that are actually obtained, the more accuracy that the meter will provide.

An important feature of the present invention is that the display device 18 of the present invention can provide a linear display of a non-linear input variable at an infinite number of input points, even though there are a limited or finite number of actual points derived from test data. To significantly increase the accuracy of the conversion or transfer function, the actual input quantity, measured along the "x" axis is used to find the two adjacent points on the curve between which the x value is situated. Referring to FIG. 7, two adjacent 78, 80 are shown and respectively designated by the coordinates $x_0$, $y_0$ and $x_1$, $y_1$. If a given input parameter defines an input or x quantity which is between the two points 78, 80, the microprocessor makes the suitable calculation and determines that the desired quantity is between the two points 78, 80. Therefore, for a given input ($x_n$) at any given point ($x_n$, $y_n$) there is an associated output ($y_n$). Each of the two adjacent points ($x_0$, $y_0$) and ($x_1$, $y_1$) define a straight line segment L. The microprocessor 42 is programmed to interpolate for any given input x between the input two points ($x_0$, $x_1$) to provide an output (y) between associated output points ($y_0$, $y_0$) by making the following computation:

$$y = \frac{(x-x_0)(y_1-y_0)}{x_1-x_0} + y_0$$

Therefore, unlike in U.S. Pat. No. 5,325,314 which requires two separate memories for storing both point sets and slopes, the present invention merely requires a single memory for storing the set point data.

Figure 8:
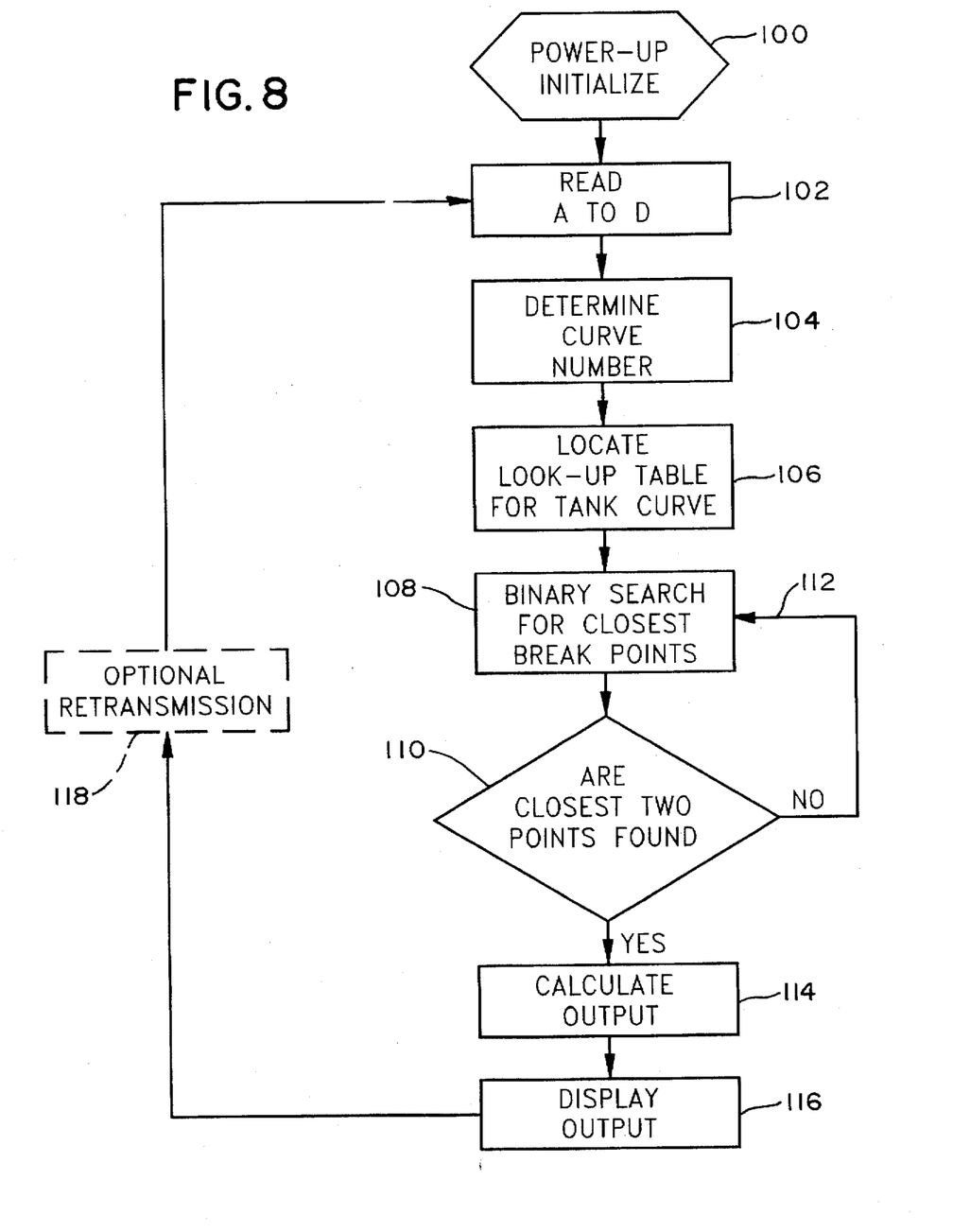
FIG. 8 is a flow chart showing the sequence of programmed operations performed by the microprocessor in FIG. 5.

Referring to FIG. 8, a flow chart is illustrated which describes the logical operations for which the microprocessor 42 is programmed to provide the desired curve fitting by interpolation. The microprocessor 42 of FIG. 5 is powered up or initialized at 100. The power-up condition is one in which the microprocessor is reading input data and is ready to display it, so that the microprocessor 42 is in condition for normal operation.

The microprocessor 42 then reads the input signal from the signal conditioning device 38, typically an A/D converter, at 102. The microprocessor 42 is programmed to determine the desired curve, such as by reading the personality connector 50, at 104. This is particularly important where the non-volatile memory 46 is provided with a plurality of finite sets of data points each defining a different conversion or transfer function. The personality connector 50, as indicated, selects the specific transfer or conversion set of points which responds to a selected tank or reservoir in which the fluid level is to be measured or monitored. Once the personality connector has been read by the microprocessor 42, the microprocessor checks, at 106, the lookup table (LUT). The microprocessor is also programmed, at 108, to perform a binary search for the closest break points, such as points 78, 80 in FIG. 7, which corresponds to the two points on either sides of the input variable x. This search is conducted by means of an iterative loop which includes step 110 and feedback loop 112. At 110, the microprocessor interrogates whether the two points 78, 80 are the closest two points found for any given input point x. If they are not, the microprocessor conducts a further binary search, at 108, until the output of step 110 is "yes".

Once the two closest points, such as points 78, 80, have been located, the microprocessor 42 is programmed to perform the following computation, at 114, for calculating the output (y):

$$y = \frac{(x-x_0)(y_1-y_0)}{x_1-x_0} + y_0$$

Once the output (y) has been computed for a given input x, these points are displayed on the display device or meter 18, at 116, and the cycle is repeated to reflect changes in the analog input, at 36, or the digital input, at 44, in FIG. 5. Such operation continues as long as the power is delivered to the circuit 34 and digital analog input are inputted to the circuit. If desired, the microprocessor 42 may optionally be programmed to retransmit the output data to a remote display, at 118, so that the same data can be displayed simultaneously at the display device 18 and at a remote display (not shown). Following retransmission the display device resumes reading the A to D at 102, and the cycle is continued.

As will be noted, therefore, the curve data is stored in novram as a series of input/output pairs. Full scale or zero data are stored for each in a separate area of the novram. The input/output pairs are compiled into a lookup table, one for each curve. When an A/D input reading is obtained, a binary search is performed on the appropriate table to locate which two input points it lies between. The value to this place is calculated by way of interpolation by using the above relationship.

The flow chart in FIG. 8 assumes that the meter 18 has already been filled up with data so that the set points are stored in the memory 46.

If the curve exemplified in FIG. 6 is broken into 50 points and the input quantity x is between points 78 and 80, the binary search returns to the relative points to either side of the input. Thus, the approach is to provide a piece-wise linear fit and then interpolate the output value based on the two points to either side of the input quantity. Therefore, the output of the signal conditioning device 38 is the actual reading. Using the actual quantity, the meter or display device of the present invention measures the difference between the actual value of the lowest input $x_0$, multiplying that by the difference in the two output values $y_0$, $y_1$, and dividing it by the difference between the two points $x_0$, $x_1$, thereby taking a proportion in order to complete the interpolation calculation. It will be clear, therefore, that the procedure used by the present invention is to break up the transfer or conversion curve into predetermined number of points that are all connected by straight lines.

Error due to conversion should be 0.5% or better, a marked improvement over the 2% achievable with many prior art devices. Better accuracies could be obtained by using a higher resolution analog to digital converter and low noise instrumentation amplifiers.

On a conventional meter, one can record a finite number of "break points". This number is limited because physically one can only place a limited amount of nomenclature on the scale. A nomenclature is usually also represented by round number (0, 10, 20, 30, etc.), even though the outcome of the calibration procedure may not have produced round numbers.

Using this new procedure, an electronic meter has the ability to contain more calibration points. They are not seen on the scale but are kept internally. During calibration, one has the option of recording as many points as one feels are needed. Calibration of the system is performed by filling the tank with a known quantity of liquid and entering this number into the computer. The computer automatically interrogates the instrument and creates a break point. Another known quantity of liquid is added and the process is repeated. It is at the user's discretion to decide where to put these points, since the worst errors are at the steep end of the curve, where the slope is highest. The operator should collect a large number of closely spaced data points in that region, limited by the resolution of the sensor.

To minimize interpolation errors, a user can manually insert more points into the transfer or conversion function shown in FIG. 6. A laptop computer, for example, can be programmed to artificially insert more points on the difficult portion of the curve.

A bar graph only provides a trend indication. Using the new method, all scales on the instruments aboard a ship, for example, can be identical. One uses a bar graph to get a sense of the empty/full 0 to 100% information and one uses the seven segment readout to get a precise reading.

Using an electronic instrument, the user will not need to rely on the pointer reading for accuracy. The pointer reading is merely an indication of trend. Even using an electronic instrument's LED bar graph, the best resolution one will ever have is limited to the number of LEDs used. For accuracy, the user will need to rely on the seven segment display. The accuracy is limited by the electronics used to derive a reading. The accuracy of the unit made by the assignee of the present application is within the safe margin of 0.5% (assuming the curve fit has been correctly performed and optimum break points are chosen). Since the scale is now linear and the user can truly rely on the digital readout, human error has been minimized, one can establish the correct number of gallons or fluid capacity in the tank.

I claim:

1. A display device for linearly displaying a non-linear input variable at an infinite number of input points over a finite range, comprising input means for receiving data representative of a non-linear input variable; computer means connected to said input means for receiving the data; a substantially linear display having a display input connected to said computer means for providing an output indication which vary linearly with a signal applied to said display input; non-volatile memory means connected to said computer means for storing a plurality of finite sets of predetermined points n of correlated input/output points ($x_n$, $y_n$) each defining a specific conversion function representative of an associated non-linear input variable for converting a given input ($x_n$) at any given point ($x_n$, $y_n$) to an associated output ($y_n$), each two adjacent points ($x_0$, $y_0$) and ($x_1$, $y_1$) defining a straight line segment, said computer means being programmed to interpolate for any given x between two inputs ($x_0$, $x_1$) to provide an output (y) between associated outputs ($y_0$, $y_1$) by making the following computation:

$$y = \frac{(x - x_0)(y_1 - y_0)}{x_1 - x_0} + y_0;$$

and personality means for selecting one of said plurality of sets of points for a given application which linearizes a predetermined specific non-linear input variable.

2. A display device as defined in claim 1, wherein the data is initially generated in analog form, and further comprising signal conditioning means for converting the analog data into digital data.

3. A display device as defined in claim 1, wherein said display comprises an analog meter.

4. A display device as defined in claim 1, wherein said display comprises a LED bar graph.

5. A display device as defined in claim 1, wherein said display comprises a digital display.

6. A display device as defined in claim 1, wherein the input/output points ($x_n$, $y_n$) cover an input range over a linear scale representing 0–100% of the input and an output range over a linear scale representing 0–100% of the output.

7. A display device as defined in claim 1, wherein said personality means comprises programmed means for selecting a predetermined code to said computer means to identify and use the desired set of correlated input/output points.

8. A tank level receiver for use with liquid level measurement in irregularly shaped tanks, comprising a meter assembly housing associated with a tank the liquid level in which is to be monitored and displayed; a display device for linearly displaying the liquid level in the irregularly shaped tank at an infinite number of points, said display device including input means for receiving digital data representative of a non-linear input variable; computer means connected to said input means for receiving the digital data; a substantially linear display having a display input connected to said computer means for providing an output indication which varies linearly with a signal applied to said display input; non-volatile memory means connected to said computer means for storing a finite set of predetermined number n of correlated input/output points ($x_n$, $y_n$) which together define conversion function for converting a given input ($x_n$) at any given point ($x_n$, $y_n$) to an associated output ($y_n$), each two adjacent points ($x_0$, $y_0$) and ($x_1$, $y_1$) defining a straight line segment, said computer means being programmed to interpolate for any given input x between two inputs ($x_0$, $x_1$) to provide an output (y) between associated outputs ($y_0$, $y_1$) by making the following computation:

$$y = \frac{(x - x_0)(y_1 - y_0)}{x_1 - x_0} + y_0.$$

9. A tank level receiver as defined in claim 8, wherein the data is initially generated in analog form, and further comprising signal conditioning means for converting the analog data into digital data.

10. A tank level receiver as defined in claim 8, wherein said display comprises an analog meter.

11. A tank level receiver as defined in claim 8, wherein said display comprises a LED bar graph.

12. A tank level receiver as defined in claim 8, wherein said display comprises a digital display.

13. A tank level receiver as defined in claim 8, wherein the input/output points $(x_n, y_n)$ cover an input range over a linear scale representing 0–100% of the input and an output range over a linear scale representing 0–100% of the output.

14. A tank level receiver as defined in claim 8, wherein said non-volatile memory means is arranged to store a plurality of finite sets of predetermined input/output points $(x_n, y_n)$ each defining a conversion function for linearizing level variations in a specific tank; and a personality means for selecting one of said plurality of sets of points for a specific tank conversion function.

15. A tank level receiver as defined in claim 14, personality means being arranged in said meter assembly housing, whereby insertion of a display device into said slot causes the personality means to automatically select the appropriate conversion function for the associated tank.

16. Method of linearly displaying a non-linear input variable at an infinite number of input points, comprising the steps of receiving digital data representative of a non-linear input variable; providing computer means connected to said input means for receiving the digital data, providing an output indication on a substantially linear display having a display input connected to said computer means which varies linearly with a signal applied to said display input; storing in a non-volatile memory means connected to said computer means a plurality of finite sets predetermined number n of correlated input/output points $(x_n, y_n)$ each defining a specific conversion function representative of an associated non-linear input variable for converting a given input $(x_n)$ at any given point $(x_n, y_n)$ to an associated output $(y_n)$ each two adjacent points $(x_0, y_0)$ and $(x_1, y_1)$ defining a straight line segment; and interpolating in said computer means for any given input x between two inputs $(x_0, x_1)$ to provide an output (y) between associated outputs $(x_0, y_1)$ by making the following computation;

$$y = \frac{(x - y_0)(y_1 - y_0)}{x_1 - x_0} + y_0;$$

and selecting one of said plurality of sets of points for a given application for linearizing a predetermined specific non-linear input variable.

17. Method as defined in claim 16, wherein the method is used to monitor the liquid level in one of a plurality of tanks, and selecting one of said finite sets of predetermined correlated input/output points $(x_n, y_n)$ which corresponds to the specific tank being monitored.

18. Method as defined in claim 16, further comprising the step of monitoring the liquid level in a tank, and generating digital data for inputting into the computer means which is a function of the level of liquid in the tank.

* * * * *